United States Patent
Vacca et al.

(10) Patent No.: US 11,041,067 B1
(45) Date of Patent: Jun. 22, 2021

(54) AQUEOUS ETHYLENE-VINYL ALCOHOL COPOLYMER DISPERSION AND OXYGEN BARRIER MULTILAYER FILM COATED WITH SAID DISPERSION

(71) Applicant: SAES GETTERS S.P.A., Lainate (IT)

(72) Inventors: Paolo Vacca, Milan (IT); Sergio Santoro, Petrizzi (IT); Marco Mudu, Rho (IT)

(73) Assignee: SAES GETTERS S.P.A., Lainate Ml (IT)

( * ) Notice: Subject to any disclaimer, the term of this patent is extended or adjusted under 35 U.S.C. 154(b) by 0 days.

(21) Appl. No.: 17/059,549

(22) PCT Filed: Jul. 11, 2019

(86) PCT No.: PCT/IB2019/055909
§ 371 (c)(1),
(2) Date: Nov. 30, 2020

(87) PCT Pub. No.: WO2020/012396
PCT Pub. Date: Jan. 16, 2020

(30) Foreign Application Priority Data

Jul. 13, 2018 (IT) .................. 102018000007179

(51) Int. Cl.
| C08L 23/08 | (2006.01) |
| C08L 29/04 | (2006.01) |
| C08K 5/5415 | (2006.01) |
| B32B 27/06 | (2006.01) |
| B32B 7/12 | (2006.01) |

(52) U.S. Cl.
CPC ............ *C08L 23/0846* (2013.01); *B32B 7/12* (2013.01); *B32B 27/06* (2013.01); *C08K 5/5415* (2013.01); *C08L 29/04* (2013.01); *B32B 2307/7244* (2013.01); *B32B 2307/732* (2013.01); *B32B 2439/70* (2013.01); *C08K 2201/003* (2013.01); *C08L 2205/03* (2013.01)

(58) Field of Classification Search
None
See application file for complete search history.

(56) References Cited

U.S. PATENT DOCUMENTS

| 2010/0196730 A1* | 8/2010 | Bekele | B29C 48/10 428/474.7 |
| 2015/0152256 A1* | 6/2015 | Nakazawa | C08K 5/07 428/35.7 |
| 2016/0177080 A1* | 6/2016 | Inoue | B32B 15/08 264/322 |

FOREIGN PATENT DOCUMENTS

| EP | 0207440 A2 | 1/1987 |
| EP | 3088462 A1 | 11/2016 |
| JP | 2001172443 A * | 6/2001 |

OTHER PUBLICATIONS

JP-2001172443-A,, Jun. 2001, Machine translation (Year: 2001).*
International Search Report and Written Opinion dated Nov. 19, 2019 in PCT/IB2019/055909, 12 pages.

* cited by examiner

*Primary Examiner* — Satya B Sastri
(74) *Attorney, Agent, or Firm* — Element IP, PLC

(57) ABSTRACT

An aqueous dispersion of ethylene-vinyl alcohol copolymers suitable to be used as lacquer to realize a thin coating both for flexible or rigid substrates, characterized by excellent oxygen and carbon dioxide barrier performances especially under high humidity conditions. The dispersion comprises a first ethylene-vinyl alcohol copolymer in the form of capsules with an ethylene content comprised between 24 and 38 mol % and a second ethylene-vinyl alcohol copolymer with an ethylene content lower than 15 mol %.

16 Claims, No Drawings

AQUEOUS ETHYLENE-VINYL ALCOHOL COPOLYMER DISPERSION AND OXYGEN BARRIER MULTILAYER FILM COATED WITH SAID DISPERSION

The present invention relates to an aqueous dispersion of Ethylene-Vinyl Alcohol (commonly abbreviated as EVOH) copolymers suitable to be used as lacquer to coat flexible or rigid substrates, in order to achieve excellent oxygen barrier properties, with particular reference to satisfy the requirements in the field of food packaging.

Ethylene vinyl alcohol (EVOH) is a formal copolymer of ethylene and vinyl alcohol, usually prepared by polymerization of ethylene and vinyl acetate and subsequent hydrolysis of the obtained ethylene-vinyl acetate (EVA). EVOH copolymer is often defined by its ethylene content measured in mol % and, as a consequence, both high-ethylene EVOH and low-ethylene EVOH can be commercially available.

With regard to the application field of the present invention, it is well known that loss of quality foods, shelf life reduction and spoilage events can occur through oxidation phenomena when the oxygen, entered into the package, reacts with food-reactive components or promotes the growth of aerobic bacteria. Therefore, an important part of the recent research in the food packaging area has been focused on preparing polymer materials with low oxygen permeability (i.e. high barrier). As anticipated above, by limiting the oxygen transmission from the environment into an oxygen-sensitive food item or a pharmaceutical product, the quality of the product can be preserved, the shelf life can be increased with a consequent waste reduction and cost saving.

In addition to the high barrier requirement, materials for plastic packages should possess various other characteristics such as mechanical strength, heat resistance, chemical resistance, transparency and flexibility.

Synthetic polymeric materials are widely used in the manufacturing of a variety of articles for food packaging, but there are specific polymers, such as ethylene-vinyl alcohol copolymer (EVOH), polyamide (PA), polyvinyl alcohol copolymer (PVOH) and polyvinyl chloride (PVC) which have conventionally been used for providing coatings or layers with oxygen barrier properties.

EVOH is characterized by better oxygen barrier performance in dry condition, at 0% relative humidity (RH), and the most relevant issue concerning its use as barrier material is related to its moisture sensitivity. Indeed, the hydrophilic nature of EVOH leads to the absorption of significant amounts of water when directly exposed to high humidity conditions (typically higher than 60% RH), due to the action of moisture that swells the polymeric composition and partially melts its crystalline phase, with a consequent increase of the final oxygen permeability. Therefore, there is a strict connection to be considered between the performance of EVOH as a barrier in food packages and the processing and storage conditions to which the packages are exposed, especially when severe conditions of high moisture and/or high temperature are involved.

EP 2164898 describes a barrier film comprising a blend of a first polymeric component, with 21 to 30 mol % ethylene-vinyl alcohol copolymer content, in an amount comprised between 65 to 95% weight, based on the blend weight, and a secondary barrier component with a range of 41-50 mol % ethylene-vinyl alcohol copolymer, in an amount comprised between 5 to 35% weight.

It is important to notice that in the above European prior art document the final barrier film is obtained through extrusion techniques, for example tubular cast coextrusion, tubular or flat cast extrusion, blown bubble extrusion (for monolayer films) or coextrusion (for multilayer films). Extrusion processes, anyway, require some characteristics of the materials to be used as, for example, melting temperature suitable for process temperatures, thermodynamic stability under high temperature processing conditions and standard atmosphere (oxidation/degradation risk), mechanical stability under compressive and shear stresses as well as limitations in additives or fillers selection due to the high temperature processing, that can limit their applicability in particular in the field of the bio-compatible packaging.

Therefore, in order to achieve the above relevant features in packaging solutions, one of the most relevant steps is represented by the preparation of a water-based formulation containing EVOH suitable for the manufacture, for instance, of lacquer coatings.

In this field, the term lacquer normally denotes a liquid formulation adopted to produce a packaging coating, which requires suitable physical and chemical resistant properties in order to protect the packed product from any deterioration and to achieve technical effects such as substrate wetting, flexibility, adhesion promotion and lubricity for the manufacturing process.

In this regard, JP 2001172443 discloses an aqueous composition comprising an ethylene-vinyl alcohol copolymer having an ethylene content of 16 to 70 mol % (high ethylene content) and an ethylene-vinyl alcohol copolymer having an ethylene content of 2 to 15 mol % (low ethylene content). The first ethylene-vinyl alcohol copolymer is dispersed in water in the form of fine particles and then in an aqueous dispersion of the second ethylene-vinyl alcohol copolymer. In JP 2001172443 the EVOH with high ethylene content is considered the best performing system under high humidity conditions, therefore, starting from its use as main component, they secondly add EVOH with low ethylene content, in order to improve the processability (i.e. solvent compatibility) of the composition. Specifically, JP 2001172443 reports that the low-ethylene EVOH is in an amount comprised between 0.05 and 100 parts by weight based on 100 parts by weight of the first EVOH, therefore they disclose a composition in which the amount of the high-ethylene EVOH is always greater than or equal to the amount of the low-ethylene EVOH.

EP 1816159 discloses an aqueous ethylene-vinyl alcohol-based copolymer dispersion characterized by gas barrier performance, long-term storage stability and good film-forming properties. EP 1816159 specifically uses an EVOH copolymer with an ethylene content of 15-65 mol % and a degree of saponification not lower than 80 mol %, a base-neutralized ethylene/α,β-unsaturated carboxylic acid-based copolymer and a polyvinyl alcohol with a degree of saponification of 75-100 mol %, a degree of polymerization of 100-3500 and in a content of 0.5-100 parts by weight per 100 parts by weight of EVOH copolymer. The directly resulting laminates show an oxygen permeability, measured under condition of 20° C. and 85% relative humidity, not higher than 0.286 fm/Pa·s, preferably not higher than 0.229 fm/Pa·s, when the coat layer thickness is 15 μm.

It is an object of the present invention to provide an aqueous ethylene-vinyl alcohol-based copolymer dispersion which is excellent in film-forming properties and, while preserving all the advantages related to a film also with a reduced thickness below 10 μm, is characterized by high gas barrier performance.

Specifically, the present invention relates to an aqueous dispersion comprising a first ethylene-vinyl alcohol copolymer in the form of capsules with an ethylene content comprised between 24 and 38 mol % (high ethylene content) dispersed in a second ethylene-vinyl alcohol copolymer with an ethylene content lower than 15 mol % (low ethylene content), characterized in that the weight ratio between said first ethylene-vinyl alcohol copolymer and said second ethylene-vinyl alcohol copolymer is comprised between 0.40 and 0.70.

Considering the above-cited prior art documents, although also the present invention discloses the use of two types of EVOH, respectively characterized by low and high ethylene contents, it is evident that the final composition realized in the present invention is completely different and new.

If compared to the prior art, the presently claimed composition is characterized by a lower amount of high-ethylene EVOH with respect to the low-ethylene EVOH, in particular in a weight ratio comprised between 0.40 and 0.70, since a higher amount of high-ethylene EVOH with respect to low-ethylene EVOH causes a decrease in the oxygen barrier performance at medium relative humidity below than 60% RH. Moreover, the claimed relative amounts of low-ethylene EVOH, having an ethylene content lower than 15 mol %, allows to obtain a water-soluble system, whereas the relative claimed amounts of EVOH with higher ethylene content, i.e. with an ethylene content in the range of 24-38 mol %, allows to increase the stability in the presence of high humidity conditions.

More specifically, the presently claimed ratio between the high- and the low-ethylene content polymers is inverted with respect to the prior art and, considering the purpose of using the present gas barrier in high humidity conditions, our invention reports better oxygen permeability performances, specifically characterized by oxygen permeability measures (OTR) at 20° C. and 80% RH lower than 10 [cc day$^{-1}$ m$^{-2}$], with respect to the values comprised between 10 to 15 [cc day$^{-1}$ m$^{-2}$] of JP 2001172443.

Moreover, the inventors discovered that, in order to improve the EVOH barrier properties through the stabilization of its crystalline form, some capsule preparation routes have been adopted, such as spray drying, emulsification, nano-precipitation and supercritical fluid technologies. In particular spray drying processing has been adopted to produce high-ethylene EVOH capsules. The obtained capsules of the final aqueous dispersion, which preserve their crystallinity in a wet environment, are characterized by a particle size distribution with a Volume Mean Diameter comprised between 0.1 and 10.0 μm and the presence of an internal cavity for particles with a diameter larger than 1.0 μm. Said Volume Mean Diameter (VIVID) can be defined as the volume weighted mean particle size of the sample measured by dry dispersion laser diffraction and calculated by using Fraunhofer theory.

In some embodiments, the aqueous dispersion can optionally comprise an alcohol, as for example ethanol or isopropanol, in an amount lower than 10% by weight, in order to improve the homogeneity of the coating.

Moreover, with the aim of improving the performance of the final barrier, the present dispersion can further comprise the addition of both active or passive fillers in an amount comprised between 0.1 and 7% by weight. In particular, the use of active fillers like zeolites, as for instance Linde Type A (LTA) zeolites, can improve the polymer performances in terms of moisture solubility inducing higher barrier performances under both low (below 60% RH) and high humidity conditions (80% RH). On the other hand, the addition of passive fillers like graphene, graphene oxide or zirconium phosphate can improve the oxygen barrier performance in dry conditions, i.e. 0% relative humidity, by decreasing the coefficient of diffusion of oxygen in the polymeric network.

Mechanical stability and adhesion of the coating can be improved by using some dispersing agents, like tetraethoxysilane (TEOS) at a concentration preferably comprised between 25 and 100% weight with respect to the EVOH amount, or fillers such as cellulose at a concentration preferably below 7% weight with respect to the EVOH amount can be added. Moreover, additives as for example chitosan, preferably in an amount comprised between 0.5 and 5% by EVOH weight, can be added in order to improve the recycling compatibility of the coating.

As second aspect achieved by the present invention, a coated barrier laminate with reduced thickness can be obtained in order to preserve significant properties like transparency, haze level, adhesion to plastic substrate, processability, higher recycling compatibility, mechanical stability and reduced costs, while keeping high barrier performances.

Indeed it is known, as reported in EP 1816159, that in order to reach high barrier performance, especially in high humidity condition, a higher thickness of the final film, usually higher than 10 μm, is required.

Nevertheless, in the present disclosure, the inventors have been able to prepare a lacquer-coated barrier laminate comprising at least a substrate and at least a coating layer, characterized in that said coating layer comprises capsules of a first ethylene-vinyl alcohol copolymer with an ethylene content comprised between 24 and 38 mol %, and a second ethylene-vinyl alcohol copolymer with an ethylene content lower than 10 mol %, said first and second copolymers being in a respective weight ratio comprised between 0.40 and 0.70, wherein said coating layer has a thickness comprised between 0.1 and 10.0 μm.

For the preparation of the lacquer-coated barrier laminate characterized by low thickness values, the dispersion can be obtained by casting using a spiral bar, the solvent is evaporated and the obtained coating submitted to a baking process at a temperature comprised between 80° C. and 150° C., preferably between 130° C. and 150° C. Alternative preparation processes can be blading, spin coating, dip coating, gravure coating, 3-roll coating, slot die coating, needle dispensing, jet dispensing. The obtained thin coated layer provides excellent OTR values, while maintaining excellent performances for the typical properties required in packaging applications like transmittance and haze values.

Moreover the composition of the lacquer coating is also characterized by relevant performance as a barrier for $CO_2$ making it, and the respective laminate, suitable for the application of food packaging in controlled atmosphere.

In some embodiments, the substrate of the laminate structure can be selected from a non-limiting group consisting of polyethylene terephthalate (PET), polyamide (PA), polyethylene furanoate (PEF), polyethylene (PE), polypropylene (PP), polybutylene adipate terephthalate (PBAT), polybutylene succinate (PBS), polylactic acid (PLA), polyhydroxyalkanoates (PHA), starch blends, lignin cellulose blend and cellophane, having a thickness comprised between 8 and 150 μm.

In other possible embodiments, said lacquer-coated laminate can consist in a multilayer system further comprising an adhesive layer, as a polyurethane laminating adhesive, which can be positioned in contact with the coated layer, with the substrate or both of them.

Hereinafter, the invention will be explained in more detail with reference to the following examples.

According to the present invention, in Samples A-H the high-ethylene EVOH capsules have been prepared by adding the ethylene-vinyl alcohol copolymer to an hydroalcoholic solution kept under stirring (at 100 rpm and 80° C.). Following the solubilization of the polymer, the resulting formulation has been spray-dried, and if required has been further submitted to jet-milling treatment in order to obtain monodispersed capsules with a Volume Mean Diameter of 5 μm (±20%) and a D90 lower than 10 μm (where D90 is defined as the particle dimension at 90% of the cumulative particle size distribution). This formulation was then added to an aqueous formulation of the low-ethylene EVOH copolymer with an ethylene content lower than 15 mol %, in order to get the final aqueous dispersion with the aimed gas barrier properties. Finally, for the preparation of the lacquer-coated barrier laminate, the dispersion has been casted using a spiral bar, the solvent has been evaporated and the obtained coating submitted to a baking process at a temperature between 80° C. and 150° C.

The comparative samples 1, 2 and 3 have been prepared with the above-described method but using relative ratios between the EVOH copolymers outside the presently claimed range.

Comparative sample 4 has been prepared according to EP 1816159. Specifically, a first solution (A) has been prepared by the solubilization of acrylic acid and NaOH in $H_2O$ at 80° C. under stirring. For the second solution (B), the amount of EVOH 27 mol % has been solubilized in 2-propanol and $H_2O$ at 80° C. under stirring. Subsequently, the first solution (A) has been injected into the second one (B) and the resulting solution was cooled at 5° C. for 12 hours and then mixed with a solution based on low-ethylene EVOH (15 mol %) and subsequently casted.

thickness (i.e. lower than 10.0 μm) and high gas barrier requirements in high humidity conditions.

As representatives of the secondary technical effects that can be obtained by using compositions according to the present invention, tables 2 and 3 show the observed values of Transmittance, Haze and $CO_2$ permeation rates for some samples.

TABLE 2

| | Optical properties | | | |
|---|---|---|---|---|
| Sample | Thickness [μm] | OTR [cc day$^{-1}$ m$^{-2}$] 80% RH, T = 23° C. | Transmittance (%) | Haze (%) |
| B | 4.0 | 2.6 | >90 | 49.2 |
| G | 10.0 | 1.4 | >90 | 82.8 |
| H | 15.0 | <1 | >90 | >80 |

The $CO_2$ permeation rates were measured by exposing both surfaces of the sample at 50% RH (50% RH/50% RH) and then increasing the relative humidity on the lacquer-coated surface of the barrier laminate to a value of 80% RH (80% RH/50% RH).

In particular, the experimental data have shown the ability of the coating obtained according with the composition of the present invention to act also as a $CO_2$ barrier, in different

TABLE 1

List of Samples and Comparative Samples.

| Sample | high-ethylene EVOH (wt %) | high-ethylene EVOH amount (mol %) | low-ethylene EVOH (wt %) | high-ethylene/ low-ethylene EVOH | Thickness (μm) | OTR (cc day$^{-1}$ m$^{-2}$) 80% RH, T = 23° C. | OTR/ μm |
|---|---|---|---|---|---|---|---|
| A | 30 | 27 | 70 | 0.43 | 5.0 | 2.4 | 0.5 |
| B | 33 | 27 | 67 | 0.50 | 4.0 | 2.6 | 0.6 |
| C | 33 | 32 | 67 | 0.50 | 7.0 | 4.3 | 0.6 |
| D | 33 | 38 | 67 | 0.50 | 6.0 | 6.0 | 1 |
| E | 35 | 27 | 65 | 0.54 | 5.0 | 4.2 | 0.8 |
| F | 40 | 27 | 60 | 0.67 | 5.0 | 3.1 | 0.6 |
| G | 33 | 27 | 67 | 0.50 | 10.0 | 1.4 | 0.1 |
| H | 33 | 27 | 67 | 0.50 | 15.0 | <1 | 0.07 |
| C1 | 0 | 27 | 100 | 0 | 5.0 | 65 | 13 |
| C2 | 25 | 27 | 75 | 0.33 | 5.0 | 30 | 6 |
| C3 | 100 | 27 | 0 | ∞ | 5.0 | >100 | >20 |
| C4 | 4.06 | 27 | 2.64 | 1.54 | 4.0 | 10.5 | 2.6 |

Sample compositions A to H are in accordance with the present invention and the relative OTR values for unit of thickness (OTR/μm) are much better compared with the values of Comparative samples 1, 2 and 3, characterized by a different ratio between the two EVOH components, as well as with Comparative sample 4 which was prepared according to EP 1816159.

The obtained results for all the above samples and comparative samples (summarized in table 1), point out that a weight ratio between the high- and low-ethylene content EVOH outside the range claimed by the present invention, either lower than 0.4 or higher than 0.7, leads to oxygen permeability values not suitable for a film with a reduced humidity conditions, with better performance if compared to the prior art (Sample B versus Comparative sample 1).

TABLE 3

| | $CO_2$ barrier properties | | |
|---|---|---|---|
| Sample | high-ethylene EVOH/ low-ethylene EVOH | $CO_2$TR [cc day$^{-1}$ m$^{-2}$] 50% RH, T = 23° C. | $CO_2$TR [cc day$^{-1}$ m$^{-2}$] 80% RH, T = 23° C. |
| C1 | 0 | 26 | 500 |
| B | 0.5 | 6 | 50 |

The invention claimed is:

1. An aqueous dispersion, comprising:
    a first ethylene-vinyl alcohol copolymer in the form of capsules with an ethylene content ranging between 24 and 38 mol %; and
    a second ethylene-vinyl alcohol copolymer with an ethylene content lower than 15 mol %,
    wherein a weight ratio between said first ethylene-vinyl alcohol copolymer and said second ethylene-vinyl alcohol copolymer is in a range of from 0.40 to 0.70.

2. The aqueous dispersion according to claim 1, wherein the first ethylene-vinyl alcohol copolymer in the form of capsules has an ethylene content ranging between 27 and 32 mol %.

3. The aqueous dispersion according to claim 1, further comprising:
    an alcohol in an amount ranging between 5 and 10% by weight.

4. The aqueous dispersion according to claim 1, wherein the first ethylene-vinyl alcohol copolymer capsules have a particle size distribution with a volume mean diameter ranging between 0.1 and 10.0 μm.

5. The aqueous dispersion according to claim 4, wherein the first ethylene-vinyl alcohol copolymer capsules with a diameter larger than 1.0 μm comprise an internal cavity.

6. The aqueous dispersion according to claim 1, further comprising:
    a filler in an amount ranging between 0.1 and 7% by weight.

7. The aqueous dispersion according to claim 6, wherein the filler is selected from the group consisting of zeolites, graphene, graphene oxide, cellulose, and zirconium phosphate.

8. The aqueous dispersion according to claim 1, further comprising:
    tetraethoxysilane (TEOS) in an amount ranging between 25 and 100% by weight with respect to the first and second ethylene-vinyl alcohol copolymers.

9. The aqueous dispersion according to claim 1, further comprising:
    chitosan in an amount ranging between 0.5 and 5% by weight with respect to the first and second ethylene-vinyl alcohol copolymers.

10. A lacquer-coated barrier laminate, comprising:
    at least a substrate; and
    at least a coating layer,
    wherein said coating layer comprises a first ethylene-vinyl alcohol copolymer in the form of capsules with an ethylene content ranging between 24 and 38 mol %, and a second ethylene-vinyl alcohol copolymer with an ethylene content lower than 15 mol %, wherein a weight ratio between said first ethylene-vinyl alcohol copolymer and said second ethylene-vinyl alcohol copolymer is in a range of from 0.40 to 0.70.

11. The lacquer-coated barrier laminate according to claim 10, wherein the substrate is selected from the group consisting of polyethylene terephthalate (PET), polyamide (PA), polyethylene furanoate (PEF), polyethylene (PE), polypropylene (PP), polybutylene adipate terephthalate (PBAT), polybutylene succinate (PBS), polylactic acid (PLA), polyhydroxyalkanoates (PHA), starch blends, lignin cellulose blend, and cellophane.

12. The lacquer-coated barrier laminate according to claim 10, wherein the substrate has a thickness ranging between 8 and 150 μm.

13. The lacquer-coated barrier laminate according to claim 10, wherein the coating layer has a thickness ranging between 0.1 and 10.0 μm.

14. The lacquer-coated barrier laminate according to claim 10, further comprising:
    an adhesive layer.

15. The lacquer-coated barrier laminate according to claim 14, wherein the coating layer is in contact with the adhesive layer.

16. The lacquer-coated barrier laminate according to claim 14, wherein the adhesive layer is a polyurethane laminating adhesive.

* * * * *